(12) United States Patent
Hoang et al.

(10) Patent No.: US 7,791,370 B1
(45) Date of Patent: Sep. 7, 2010

(54) CLOCK DISTRIBUTION TECHNIQUES FOR CHANNELS

(75) Inventors: Tim Tri Hoang, San Jose, CA (US);
Thungoc M. Tran, San Jose, CA (US);
Wilson Wong, San Francisco, CA (US);
Sergey Shumarayev, Los Altos Hills, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 12/470,455

(22) Filed: May 21, 2009

(51) Int. Cl.
*G06F 7/38* (2006.01)
*H03K 19/173* (2006.01)

(52) U.S. Cl. .............................. 326/38; 326/41; 326/93
(58) Field of Classification Search ........................ None
See application file for complete search history.

(56) References Cited

U.S. PATENT DOCUMENTS

| | | |
|---|---|---|
| 6,750,675 B2 | 6/2004 | Venkata et al. |
| 6,867,616 B1 | 3/2005 | Venkata et al. |
| 7,245,240 B1 * | 7/2007 | Nguyen et al. ............... 341/100 |
| 7,272,677 B1 | 9/2007 | Venkata et al. |
| 7,276,936 B1 | 10/2007 | Hoang et al. |
| 7,276,937 B2 | 10/2007 | Hoang et al. |
| 7,304,507 B1 | 12/2007 | Tran et al. |
| 2007/0019766 A1 * | 1/2007 | Bereza et al. ............... 375/354 |

\* cited by examiner

*Primary Examiner*—Anh Q Tran
(74) *Attorney, Agent, or Firm*—Steven J. Cahill

(57) ABSTRACT

A circuit includes a first area, a second area, and a third area. The second area includes a locked loop circuit that generates a clock signal. The locked loop circuit receives a supply voltage that is isolated from noise generated in the first area. The third area includes multiple quads of channels and a clock line coupled to route at least one clock signal generated in the second area to the channels in each of the quads. The third area is separate from the second area in the circuit.

23 Claims, 8 Drawing Sheets

CLOCK DISTRIBUTION TECHNIQUES FOR CHANNELS

BACKGROUND OF THE INVENTION

The present invention relates to electronic circuits, and more particularly, to clock distribution techniques for channels.

Many high-speed data transmission protocols can support several channels. For example, the Peripheral Component Interconnect Express 2.0 (PCIE-GEN2) protocol supports 4, 8, or 12 channels, the QuickPath Interconnect (QPI) protocol supports up to 20 channels, the HyperTransport protocol can use up to 16 or 30 channels, and the Interlaken protocol is designed to support from 1 to 24 channels. Interlaken supports a frequency range of 4.9 gigabytes per second (Gbps) to 6.375 Gbps.

BRIEF SUMMARY OF THE INVENTION

According to some embodiments, a circuit includes a first area, a second area, and a third area. The second area includes a locked loop circuit that generates a clock signal. The locked loop circuit receives a supply voltage that is isolated from noise generated in the first area. The third area includes multiple quads of channels and a clock line coupled to route at least one clock signal generated in the second area to the channels in each of the quads. The third area is separate from the second area in the circuit.

Various objects, features, and advantages of the present invention will become apparent upon consideration of the following detailed description and the accompanying drawings.

DETAILED DESCRIPTION OF THE INVENTION

Figure 1:
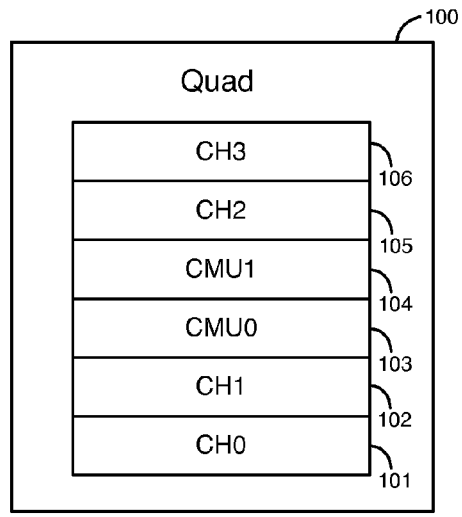
FIG. 1 illustrates an example of a quad that contains multiple channels for transmitting and receiving signals, according to an embodiment of the present invention.

FIG. 1 illustrates an example of a quad that contains multiple channels for transmitting and receiving signals. Quad 100 shown in FIG. 1 includes four regular channels and two clock multiplier unit (CMU) channels. The four regular channels are channel 101 (CH0), channel 102 (CH1), channel 105 (CH2), and channel 106 (CH3). The two CMU channels are channel 103 (CMU0) and channel 104 (CMU1).

Channels 101, 102, 105, and 106 are bonded together. Bonding channels together refers to operating the channels at the same frequency and synchronizing the channels to the same phase-locked loop (PLL). Many applications use a bonding mode in which data skew from channel-to-channel is reduced, e.g., 2 unit intervals (UI) for PCIE-GEN2. If two channels are bonded, and the user sends the same data pattern to both channels, the outputs should appear at the transmitter pins at about the same time. The maximum delay can be, for example, 2 unit intervals (UI) at 5 Gbps, where 2 UI equals 800 picoseconds.

Figure 2:
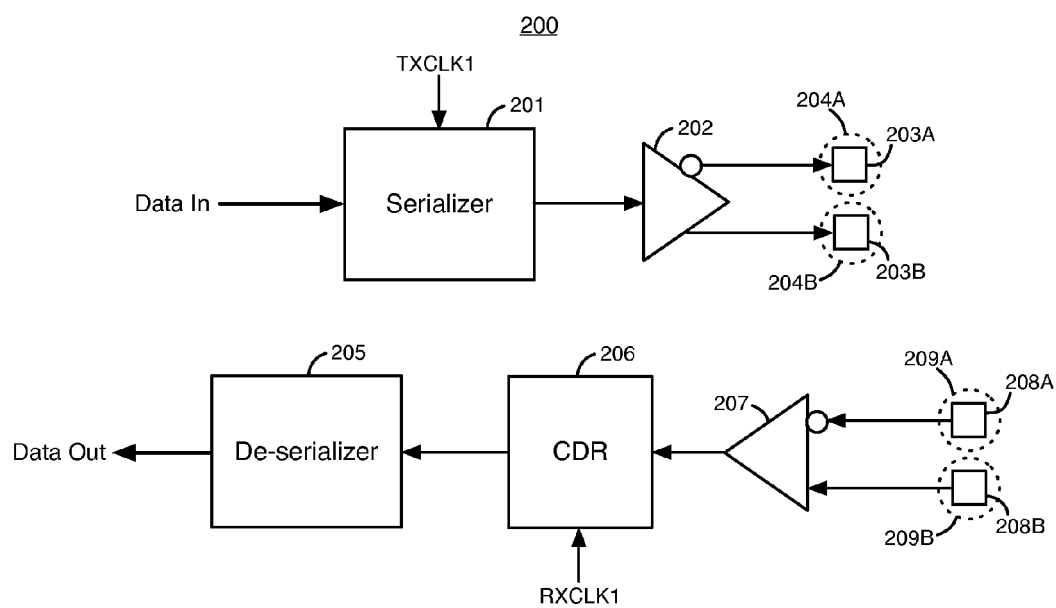
FIG. 2 illustrates an example of a regular channel, according to an embodiment of the present invention.

FIG. 2 illustrates an example of a regular channel 200. Regular channel 200 is an example of each of the channels 101, 102, 105, and 106 in quad 100. Regular channel 200 includes a transmitter portion and a receiver portion. The transmitter portion of channel 200 includes a serializer circuit 201, a driver circuit 202, and output pins 203A-203B. The receiver portion of channel 200 includes de-serializer circuit 205, clock data recovery circuit 206, receiver buffer circuit 207, and pins 208A-208B.

Pins 203A-203B are connected to differential outputs of driver circuit 202 and to solder bumps 204A-204B, respectively. Pins 208A-208B are connected to differential inputs of receiver buffer circuit 207 and to solder bumps 209A-209B, respectively. Quad 100 is typically located in an integrated circuit, and the integrated circuit is housed inside a package. Solder bumps 204A-204B and 209A-209B connect pins 203A-203B and 208A-208B, respectively, to a circuit board through routing in the package. Solder bumps 204A-204B and 209A-209B are large enough to conduct high frequency signals.

Serializer 201 in the transmitter portion of the channel 200 receives a parallel stream of input data (Data In), e.g., from a physical coding sub-layer (PCS) portion of the integrated circuit (IC) or from the core of the IC. Serializer 201 converts the parallel stream of input data into a serial stream of data in response to a transmitter clock signal TXCLK1. Serializer 201 can, for example, be a shift register that shifts incoming bits through the registers in response to clock signal TXCLK1. Serializer 201 then transmits the serial stream of data to an input terminal of driver circuit 202. Driver circuit 202 drives the serial stream of data as a differential output signal to pins 203A-203B and bumps 204A-204B.

Receiver buffer 207 receives data as a differential input signal through pins 208A-208B and bumps 209A-209B and drives the data as a single-ended serial data stream to an input terminal of clock data recovery circuit 206. Clock data recovery (CDR) circuit 206 has an oscillator that generates internal clock signals using a receiver clock signal RXCLK1. Initially, CDR circuit 206 causes the oscillator to generate internal clock signals that have the same frequency as RXCLK1. CDR circuit 206 then phase-aligns the internal clock signals to the transitions in the serial data stream received from receiver buffer 207. An example of the CDR circuits described herein is shown in and described with respect to FIG. 1 of commonly assigned U.S. patent application Ser. No. 12/121,028, filed May 15, 2008, which is incorporated by reference herein in its entirety.

The serial data stream is then transmitted from CDR circuit 206 to an input terminal of de-serializer circuit 205. De-serializer circuit 205 converts the serial data stream into a set of parallel data signals (Data Out). De-serializer 205 may transmit the parallel data signals to the PCS portion or the core of the IC.

Figure 3:
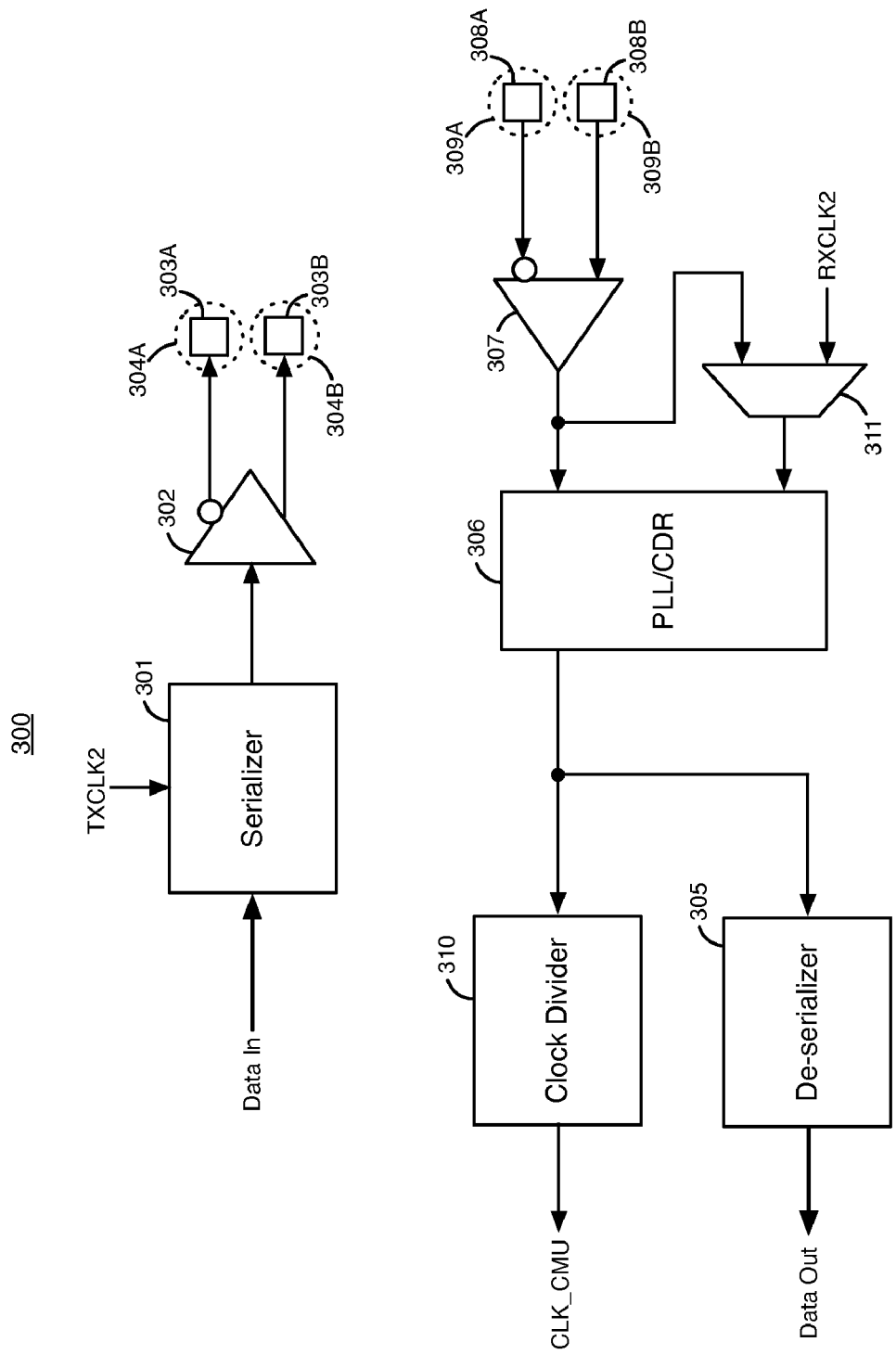
FIG. 3 illustrates an example of a clock multiplier unit (CMU) channel, according to an embodiment of the present invention.

FIG. 3 illustrates an example of a clock multiplier unit (CMU) channel 300. CMU channel 300 is an example of each of the channels 103 and 104 in quad 100. CMU channel 300 includes a receiver portion and a transmitter portion. The transmitter portion of channel 300 has a serializer circuit 301, a driver circuit 302, and pins 303A-303B. The receiver portion of channel 300 includes a receiver buffer circuit 307, a multiplexer 311, a phase-locked loop (PLL) and clock data recovery (CDR) circuit 306, a de-serializer 305, a clock frequency divider circuit 310, and pins 308A-308B.

Pins 303A-303B are connected to differential outputs of driver circuit 302 and to solder bumps 304A-304B, respectively. Pins 308A-308B are connected to differential inputs of receiver buffer circuit 307 and to solder bumps 309A-309B, respectively. Solder bumps 304A-304B and 309A-309B connect pins 303A-303B and 308A-308B, respectively, to a circuit board through routing in the package. Solder bumps 304A-304B and 309A-309B are large enough to conduct high frequency signals.

Serializer 301 in the transmitter portion of channel 300 receives a parallel stream of input data (Data In), e.g., from the PCS portion of the integrated circuit (IC) or from the core of the IC. Serializer 301 converts the parallel stream of input data into a serial stream of data in response to a transmitter clock signal TXCLK2. Serializer 301 transmits the serial stream of data to an input terminal of driver circuit 302. Driver circuit 302 drives the serial stream of data as a differential output signal to pins 303A-303B and bumps 304A-304B.

CMU channels have a dual function. A CMU channel can be configured to function as a phase-locked loop (PLL) that generates a clock signal for clocking the serializer circuits in the transmitters in other channels on the IC. Alternatively, a CMU channel can be configured as a regular channel that transmits and receives data signals. Referring to FIG. 3, the receiver portion of CMU channel 300 can be configured as a phase-locked loop (PLL) circuit or as a regular channel.

When the receiver portion of CMU channel 300 is configured as a regular channel, PLL/CDR circuit 306 is configured to function as a clock data recovery circuit, and receiver buffer 307 receives data as a differential input signal through pins 308A-308B and bumps 309A-309B. Receiver 307 drives the data as a single-ended serial data stream to a first input terminal of CDR circuit 306. CDR circuit 306 generates internal clock signals using a receiver clock signal RXCLK2, and then phase-aligns the internal clock signals to the transitions in the serial data stream received from receiver buffer 307. Multiplexer 311 transmits clock signal RXCLK2 to a second input terminal of CDR circuit 306 when channel 300 is configured to function as a regular channel. The serial data stream is transmitted from CDR circuit 306 to an input terminal of de-serializer circuit 305. De-serializer circuit 305 converts the serial data stream into a set of parallel data signals (Data Out). De-serializer 305 may transmit the parallel data signals to the PCS portion or the core of the IC.

When the receiver portion of CMU channel 300 is configured as a phase-locked loop (PLL), PLL/CDR circuit 306 functions as a PLL instead of a CDR circuit, and receiver buffer 307 receives a differential digital clock input signal through pins 308A-308B and bumps 309A-309B. Receiver buffer 307 converts the differential clock input signal into a single-ended clock signal and transmits the single-ended clock signal to the second input terminal of PLL 306 through multiplexer 311. PLL 306 generates an output clock signal in response to the input clock signal received from receiver buffer 307. The output clock signal of PLL 306 is transmitted to an input terminal of clock frequency divider circuit 310. Clock frequency divider circuit 310 divides the frequency of the output clock signal of PLL 306 by a divider value to generate a frequency divided output clock signal CLK_CMU. The frequency of CLK_CMU is less than the frequency of the output clock signal of PLL 306.

Typically, an integrated circuit design can only support a limited number of channels on the die. Each of the channels has its own dedicated solder bumps on the board that are used to route signals to and from the channel. For example, the Stratix®IV GX field programmable gate array (FPGA) manufactured by Altera Corporation of San Jose, Calif., has only 24 channels (regular and CMU channels) on each side of the device for a total of 48 channels. A reticle size limitation prevents additional channels from being added to the device. Also, additional solder bumps cannot be added without changing the board and the package.

If all 24 channels on each side of the device are used to transmit and receive data, the CMU channels cannot be used as clock signal sources, because the CMU channels are configured as regular channels instead of as PLLs. When one of the CMU channels functions as a PLL, that CMU channel uses an input reference clock signal to generate an output clock signal. The output clock signal clocks serializer circuits in other channels on the device. A device with only 24 channels on each side cannot support 24 channel bonding on each side of the device without adding new clock signal sources. Such a device cannot support the maximum number of channels (e.g., 24 channels) specified in some protocols such as Interlaken. In order to support 24 channel bonding on each side of a device having 24 channels on each side, one or more dedicated clock lines can be added to the device to route clock signals to the channels from the periphery area of the device.

Figure 4:
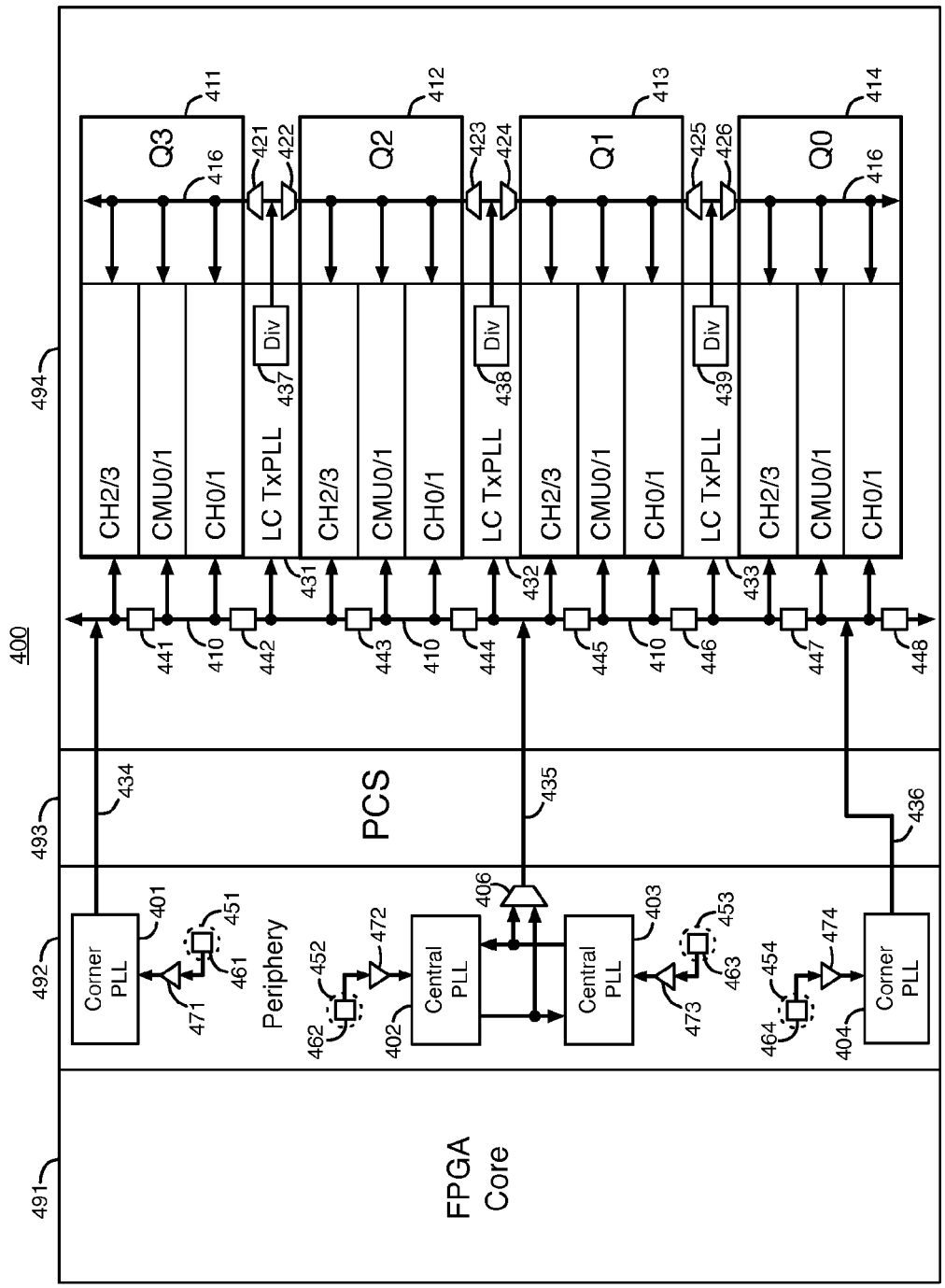
FIG. 4 illustrates an example of a portion of a device that has a dedicated clock line for routing clock signals to channels on the device, according to an embodiment of the present invention.

FIG. 4 illustrates an example of a device that has a dedicated clock line for routing clock signals to channels on the device. FIG. 4 illustrates a portion of an integrated circuit (IC) device 400. IC 400 is a field programmable gate array (FPGA). However, embodiments of the present invention can be applied to other types of integrated circuits such as application specific integrated circuits.

IC 400 includes an FPGA core area 491, a periphery area 492, a PCS area 493, and a channel area 494. The periphery area 492 of IC 400 includes 4 phase-locked loops (PLLs) 401-404, input buffers 471-474, input pins 461-464, and multiplexer 406. The channel area 494 of IC 400 includes clock line 410, bi-directional buffers 441-448, quads 411-414, multiplexers 421-426, clock routing network 416, and LC transmitter (Tx) PLLs 431-433. Each of the quads 411-414 has 6 channels including 2 CMU channels and 4 regular channels as described above with respect to FIG. 1.

Clock line 410 is a special dedicated clock line that routes one or more clock signals to channels in quads 411-414. The clock signals routed through clock line 410 can be used, for example, to train clock data recovery (CDR) circuits in the receiver portions of the channels. Alternatively, clock line 410 can be used to route one or more clock signals to serializer circuits in the transmitter portions of the channels. Thus, clock line 410 can be used to route one or more clock signals to the channels in area 494 to train the receivers or transmitters in the channels. Clock line 410 can also route clock signals to input terminals of LC Tx PLLs 431-433 to support PLL cascading.

Because clock line 410 routes one or more clock signals to the channels in channel area 494, the CMU channels in quads 411-414 do not need to be used to route clock signals to the regular channels in quads 411-414. Instead, the CMU channels in quads 411-414 can be configured to function as regular channels. Clock line 410 allows IC 400 to support 24 channel bonding in channel area 494, because all 24 channels in channel area 494 can be used as regular channels.

Clock signals are routed to the channels through clock line 410 from at least one of PLLs 401-404. For example, corner PLL 401 can generate a first clock signal that is routed to the channels through clock line 434 and clock line 410. Also, central PLL 402 can generate a second clock signal that is routed to the channels through multiplexer 406, clock line 435, and clock line 410. Alternatively, central PLL 403 can generate a third clock signal that is routed to the channels through multiplexer 406, clock line 435, and clock line 410. Also, corner PLL 404 can generate a fourth clock signal that is routed to the channels through clock line 436 and clock line 410. In alternative embodiments, PLLs 401-404 can be substituted with delay-locked loop (DLL) circuits. The DLL circuits generate clock signals that are routed to the channels through clock line 410.

Clock line 410 is a segmented clock line that contains multiple segments. Each segment is a portion of clock line 410 that can be isolated from the other segments in clock line 410. When one of the segments of clock line 410 is isolated from the other segments, that segment can route a separate clock signal to a subset of the channels in area 494.

Clock line 410 includes bi-directional buffers 441-448. Bi-directional buffers 441-448 can couple two or more of the segments of clock line 410 together. Each of the bi-directional buffers 441-448 can be configured to drive an input clock signal in one of two possible directions. Alternatively, bi-directional buffers 441-448 can electrically isolate two or more of the segments of clock line 410 from each other.

Figure 5:
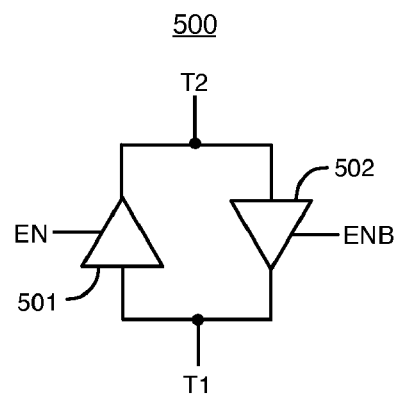
FIG. 5 illustrates an example of a bi-directional buffer circuit, according to an embodiment of the present invention.

FIG. 5 illustrates an example of a bi-directional buffer circuit 500. The bi-directional buffer circuit 500 shown in FIG. 5 is an example of each of the bi-directional buffer circuits 441-448 in FIG. 4. Bi-directional buffer circuit 500 includes tri-state driver circuits 501 and 502. Tri-state driver circuit 501 has an input terminal coupled to terminal T1 of bi-directional buffer circuit 500, an output terminal coupled to terminal T2 of bi-directional buffer circuit 500, and an enable terminal coupled to receive an enable signal EN. Tri-state driver circuit 502 has an input terminal coupled to terminal T2 of bi-directional buffer circuit 500, an output terminal coupled to terminal T1 of bi-directional buffer circuit 500, and an enable terminal coupled to receive an enable signal ENB. Terminal T1 is coupled to a first conductor in clock line 410, and terminal T2 is coupled to a second conductor in clock line 410.

In order to drive a clock signal on clock line 410 from terminal T1 to terminal T2, the EN signal is driven to a logic high state to turn on tri-state driver circuit 501, and the ENB signal is driven to a logic low state to turn off tri-state driver circuit 502. When tri-state driver circuit 501 is on, tri-state driver circuit 501 drives the clock signal from terminal T1 to terminal T2.

In order to drive a clock signal on clock line 410 from terminal T2 to terminal T1, the EN signal is driven to a logic low state to turn off tri-state driver circuit 501, and the ENB signal is driven to a logic high state to turn on tri-state driver circuit 502. When tri-state driver circuit 502 is on, tri-state driver circuit 502 drives the clock signal from terminal T2 to terminal T1.

Tri-state driver circuits 501 and 502 can both be turned off at the same time to decouple terminals T1 and T2 from each other. When terminals T1 and T2 are decoupled, two segments of clock line 410 are electrically isolated from each other, and the bi-directional buffer of FIG. 5 is tri-stated. Tri-state driver circuits 501 and 502 are off at the same time and buffer 500 is tri-stated when enable signals EN and ENB are both in logic low states at the same time. Enable signals EN and ENB can be both driven to logic low states to decouple terminal T1 from terminal T2. Enable signals EN and ENB are driven to complementary logic states to turn on one of tri-state drivers 501-502, and enable signals EN and ENB are both driven to the same logic low state to turn off both of tri-state drivers 501-502. Enable signals EN and ENB are not driven to logic high states at the same time.

Bi-directional buffers 441-448 add flexibility to clock line 410. Bi-directional buffers 441-448 can be programmed to drive clock signals up or down clock line 410.

One or more of bi-directional buffers 441-448 can be tri-stated as described above with respect to FIG. 5 to divide clock line 410 into two or more segments. If any of the bi-directional buffers 441-448 are tri-stated, two segments of clock line 410 are electrically isolated from each other to drive separate clock signals to the channels.

In one embodiment, PLLs 401-404 can drive two separate clock signals to two isolated segments of clock line 410. For example, bi-directional buffer 442 can be tri-stated to decouple the segment of clock line 410 that is above buffer 442 from the segment of clock line 410 that is below buffer 442. A first clock signal is driven from PLL 401 to each of the 6 channels in quad 411 through the first segment of clock line 410. In this example, bi-directional buffer 441 is enabled to drive the clock signal from PLL 401 down to channels CMU0, CMU1, CH0, and CH1 in quad 411. One of PLLs 402-404 drives a second clock signal to PLLs 431-433 and the channels in quads 412-414 through a second segment of clock line 410. Buffers 443-447 couple together portions of clock line 410 into the second segment.

In another embodiment, PLLs 401-404 can drive three separate clock signals to three isolated segments of clock line 410. For example, bi-directional buffers 442 and 446 can both be tri-stated to divide clock line 410 into three separate segments. In this example, PLL 401 drives a first clock signal to the channels in quad 411 through clock line 434 and the first segment of clock line 410 including buffer 441. Either PLL 402 or PLL 403 drives a second clock signal to PLLs 431-432 and the channels in quads 412-413 through multiplexer 406, clock line 435, and the second segment of clock line 410. Bi-directional buffers 443-444 are enabled to drive the second clock signal up from clock line 435, and bi-directional buffer 445 is enabled to drive the second clock signal down from clock line 435. PLL 404 drives a third clock signal to the channels in quad 414 and PLL 433 through clock line 436 and the third segment of clock line 410. Bi-directional buffer 447 is enabled to drive the third clock signal up from clock line 436, and bi-directional buffer 448 is enabled to drive the third clock signal down from clock line 436 (e.g., to other circuitry not shown in FIG. 4).

PLLs 401-404 are general purpose PLLs. PLLs 401-404 are implemented to support clock synthesis for various applications on IC 400, such as the channels in area 494 or other circuitry that is not in the channels. For example, PLLs 401-

404 can provide additional clock signals directly to the channels in area 494 to train one or more transmitters and receivers in the channels.

As another example, PLLs 401-404 can provide additional reference clock signals to PLLs in channel area 494 to support PLL cascading. Some devices have a limited number of reference clock signals to use in the channels. PLLs 401-404 can generate additional reference clock signals that are transmitted through clock line 410 to LC Tx PLLs 431-433. LC Tx PLLs 431-433 can use the one or more clock signals routed through clock line 410 from PLLs 401-404 as reference clock signals to generate one or more additional clock signals that are used, e.g., to drive transmitters in the channels. In an alternative embodiment, PLLs 431-433 are substituted with delay-locked loop (DLL) circuits. The DLL circuits use the clock signals received from clock line 410 to generate additional clock signals that are routed to transmitters in the channels to drive the serializer circuits.

Figure 8:
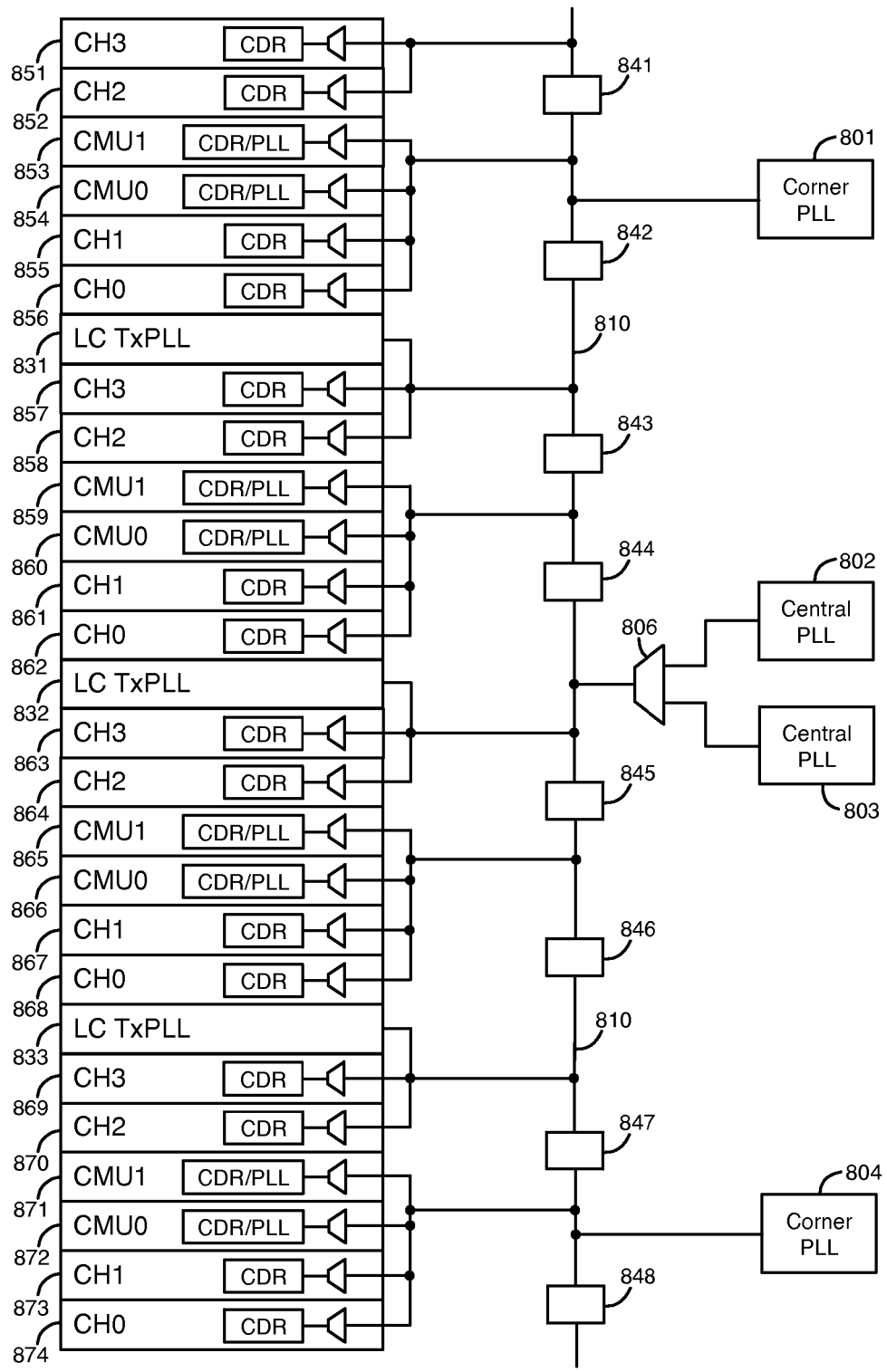
FIG. 8 illustrates an example of a second portion of a device that has a dedicated clock line for routing clock signals to a second channel area on the device, according to an embodiment of the present invention.

Four PLLs 401-404 in periphery area 492 are shown in FIG. 4 merely as an example. In other embodiments, more or less than 4 PLLs can drive separate clock signals to different segments of clock line 410 along dedicated connections to clock line 410. Also, 8 bi-directional buffers 441-448 are shown in FIG. 8 merely as an example. In other embodiments, clock line 410 has more or less than 8 bi-directional buffers that can divide clock line 410 into any desired number of segments.

Figure 6:
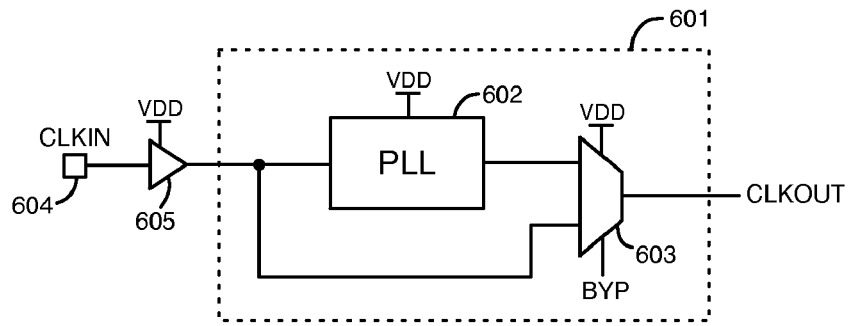
FIG. 6 illustrates phase-locked loops having a bypass mode, according to an embodiment of the present invention.

PLLs 401-404 can be configured in a PLL mode or in a bypass mode. FIG. 6 illustrates a more detailed example of PLLs 401-404. PLL circuit block 601 shown in FIG. 6 is an example of each of PLLs 401-404. PLL circuit block 601 includes a phase-locked loop (PLL) circuit 602 and a multiplexer circuit 603. PLL 602 can, for example, include a phase-frequency detector, a charge pump, a loop filter, a voltage-controlled oscillator (VCO), and a feedback clock frequency divider. An input buffer 605 drives a clock input signal CLKIN received from an input pin 604 to an input terminal of PLL 602 and to an input terminal of multiplexer 603. Input buffer 605, PLL 602, and multiplexer 603 receive charge from a low noise supply voltage VDD.

PLL 602 uses clock signal CLKIN as an input reference clock signal to generate an output clock signal. The output clock signal of PLL 602 is transmitted to another input terminal of multiplexer 603. Multiplexer 603 is controlled by a select signal BYP. When PLL circuit block 601 is configured in PLL mode, signal BYP is in a logic state that causes multiplexer 603 to transmit the output clock signal of PLL 602 to the output terminal of multiplexer 603 as clock signal CLKOUT. When PLL circuit block 601 is configured in bypass mode, signal BYP is in a logic state that causes multiplexer 603 to transmit the clock signal CLKIN as received from input buffer 605 to the output terminal of multiplexer 603 as clock signal CLKOUT. Clock signal CLKOUT represents the output clock signal of the PLL 401, 402, 403, or 404 in FIG. 4. Thus, in bypass mode, multiplexer 603 bypasses PLL 602.

Referring again to FIG. 4, input buffer 471 is coupled to drive an input clock signal from pin 461 and bump 451 to PLL 401. Pin 461 is coupled to bump 451. Input buffer 472 is coupled to drive an input clock signal from pin 462 and bump 452 to PLL 402. Pin 462 is coupled to bump 452. Input buffer 473 is coupled to drive an input clock signal from pin 463 and bump 453 to PLL 403. Pin 463 is coupled to bump 453. Input buffer 474 is coupled to drive an input clock signal from pin 464 and bump 454 to PLL 404. Pin 464 is coupled to bump 454. Bumps 451-454 are configured to conduct lower frequency signals than the bumps coupled to the channels in quads 411-414. Each of the buffers 471-474 corresponds to buffer 605, and each of the pins 461-464 corresponds to pin 604 in FIG. 6.

When PLLs 401-404 are in PLL mode, PLLs 401-404 generate new clock signals at their output terminals using input clock signals received from pins 461-464, respectively. When PLLs 401-404 are in bypass mode, PLLs 401-404 simply transmit the clock signals received from pins 461-464, respectively, to their output terminals. The output clock signals at the output terminals of PLLs 401-404 can be transmitted to clock lines 434-436, as described above. In some embodiments, one or more of PLLs 401-404 are in PLL mode, while at the same time, one or more of the other PLLs 401-404 are in bypass mode.

PLLs 401-404, multiplexer 406, and input buffers 471-474 receive charge from a low noise supply voltage VDD that does not provide charge to circuitry located in FPGA core area 491. The circuitry in clock line 410, including bi-directional buffers 441-448, also receives charge from a low noise supply voltage that does not provide charge to circuitry in FPGA core area 491. The supply voltages that provide charge to PLLs 401-404, multiplexer 406, input buffers 471-474, and clock line 410 can be the same supply voltage or multiple low noise supply voltages. FPGA core area 491 contains programmable logic circuits that transmit a substantial amount of noise to the supply voltage that they receive charge from.

Because PLLs 401-404, multiplexer 406, input buffers 471-474, and clock line 410 are not driven by a supply voltage that also drives circuitry in FPGA core area 491, PLLs 401-404, multiplexer 406, input buffers 471-474, and clock line 410 are isolated from noise generated in FPGA core area 491. Clock lines 434-436 are also isolated from noise in FPGA core area 491. PLLs 401-404 drive clock signals through clock line 410 to channels and PLLs in channel area 494 without routing through FPGA core area 491. As a result, the signal integrity of the clock signals routed through clock line 410 is not affected by noise from FPGA core area 491, and the performance of the transmitters and receivers in quads 411-414 is not compromised by noise from FGPA core area 491. Providing an isolated supply voltage and high-speed bi-directional buffers 441-448 assures a low jitter clock signal source for high-speed applications of the channels in quads 411-414.

Channel area 494 also includes three inductor-capacitor (LC) transmitter (Tx) phase-locked loop (PLL) circuits 431-433. Each of LC TX PLLs 431-433 receives a reference clock signal from clock line 410. If clock line 410 is not segmented, PLLs 431-433 each receive the same clock signal from clock line 410. If clock line 410 is divided into two segments, then two of PLLs 431-433 receive the same clock signal from clock line 410, and the third PLL receives a different clock signal from clock line 410. If clock line 410 is divided into three segments, then each of PLLs 431-433 receives a different clock signal from clock line 410.

LC Tx phase-locked loops 431-433 use the clock signals received from clock line 410 as reference clock signals to generate additional clock signals. For example, each of PLLs 431-433 can be coupled to receive a clock signal from clock line 410 at the phase-frequency detector and can generate one or more clock signals using the VCO.

PLLs 431-433 have output frequency divider circuits 437-439, respectively. PLLs 431-433 transmit the output clock signals of the VCOs to input terminals of frequency divider circuits 437-439, respectively. Each frequency divider circuit 437-439 divides the frequency of a VCO output clock signal by a frequency division value to generate a frequency divided output clock signal. The frequency of the frequency divided output clock signal is smaller than the frequency of the VCO output clock signal.

In some embodiments, PLLs 431-433 may have a limited frequency range (e.g., from 4.9 Gbps to 6.375 Gbps). Dividers 437-439 extend the frequency range of the output clock signals of PLLs 431-433. For example, if dividers 437-439 divide the frequencies of the VCO output clock signals by 2, the frequency range of the output clock signals of PLLs 431-433 is extended down to 2.5 Gbps to 3.1875 Gbps. Dividers 437-439 enhance the functionality of the device by allowing IC 400 to support additional protocols, such as PCIE-GEN1 (at 2.5 Gbps) and XAUI (at 3.125 Gbps) using LC Tx PLLs 431-433.

Frequency divider circuits 437-439 transmit the frequency divided output clock signals to clock routing network 416. Clock routing network 416 is described in further detail below with respect to FIG. 9. Clock routing network 416 can transmit one or more of the frequency divided output clock signals from dividers 437-439 to any of the channels in quads 411-414. Having three LC Tx PLLs 431-433 in channel area 494 provides the flexibility to generate many different clock signals that support different output data rates used by different transmitters in quads 411-414.

Clock routing network 416 includes multiplexers 421-426. Multiplexers 421-426 can be configured to drive clock signals from divider circuits 437-439 up or down network 416 to the channels in quads 411-414. Clock routing network 416 can be configured to route clock signals from one divider 437-439 to the channels in all four quads. Alternatively, clock routing network 416 can be configured to route clock signals from two or all three of dividers 437-439 to quads 411-414.

Typically, the transmitter and receiver portions of a channel use different clock signals having different frequencies to drive the serializer and CDR circuits, respectively. In one embodiment, clock line 410 routes clock signals from PLLs 401-404 to PLLs 431-433 to implement PLL cascading. PLLs 431-433 use clock signals from clock line 410 as reference clock signals to generate frequency divided clock signals at the output terminals of dividers 437-439. The frequency divided clock signals are transmitted from divider circuits 437-439 in PLLs 431-433 through clock routing network 416 to the transmitter portions of the channels in quads 411-414.

In this embodiment, the frequency divided clock signals generated by dividers 437-439 are routed through network 416 to serializer circuits in the transmitter portions of the channels in quads 411-414. Thus, the transmitter clock signal TXCLK1 in the regular channels and the transmitter clock signal TXCLK2 in the CMU channels that clock the serializer circuits are generated by PLLs 431-433 and are routed through network 416.

Also, in this embodiment, clock line 410 routes clock signals from PLLs 401-404 to the receiver portions of the channels to train the clock data recovery (CDR) circuits in the channels in quads 411-414. The receiver clock signals RXCLK1 and RXCLK2 in the regular and CMU channels that train the CDR circuits are routed through clock line 410. Thus, the receiver and transmitter portions of each channel can receive different clock signals that have different frequencies and that are generated by different PLLs.

This embodiment allows IC 400 to use all 24 channels in channel area 494 as regular channels to transmit and receive data through the pins and bumps in area 494. The CMU channels can be used as regular channels instead of PLLs, because clock line 410 routes one or more clock signals to area 494 that are used to drive the receivers and PLLs 431-433 in quads 411-414. Thus, IC 400 supports 24 channel bonding.

In an alternative embodiment, frequency divided clock signals generated by dividers 437-439 can be routed through network 416 to the receiver portions of one or more of the channels in quads 411-414 to train the CDR circuits in these channels.

Figure 7:
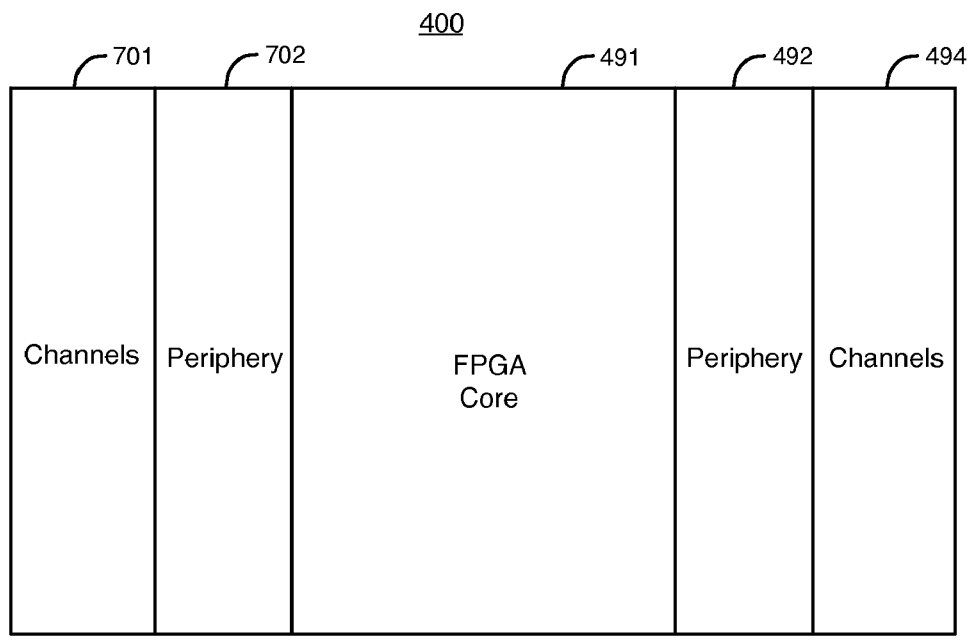
FIG. 7 illustrates an example of an integrated circuit device that contains two channel areas on two sides of the device, according to an embodiment of the present invention.

FIG. 7 illustrates an example of an integrated circuit device that contains two channel areas on two sides of the device. FIG. 7 illustrates additional areas of device 400. Device 400 includes channel areas 701 and 494, periphery areas 702 and 492, and FPGA core area 491. The PCS areas are not shown in FIG. 7. Examples of channel and periphery areas 701-702 are shown in FIG. 8.

Periphery area 702 in FIG. 8 includes PLLs 801-804 and multiplexer 806. Channel area 701 in FIG. 8 includes channels 851-874 and PLLs 831-833. One or more of PLLs 801-804 transmit one or more clocks signals to channels 851-874 and PLLs 831-833 via clock line 810.

Clock line 810 routes clock signals to CDR circuits in the receiver portions of regular channels 851-852, 855-858, 861-864, 867-870, and 873-874. Clock line 810 routes clock signals to CDR circuits in CMU channels 853-854, 859-860, 865-866, and 871-872. The CMU channels can be configured as regular channels that transmit and receive data, because clock line 810 transmits clock signals to the channels and to PLLs 831-833. As a result, the channels shown in FIG. 8 can support 24 channel bonding using all 24 channels as regular channels.

Clock line 810 in FIG. 8 includes eight bi-directional buffer circuits 841-848. Each of bi-directional buffers 841-848 has the circuitry shown in FIG. 5 and operates as discussed with respect to FIG. 5. One or two of the bi-directional buffers 841-848 can be tri-stated to split clock line 810 into two or three segments as discussed above with respect to FIG. 4. In alternative embodiments, 4 or more PLLs drive clock signals to clock line 810, and clock line 810 is split into 4 or more segments by tri-stating three or more of bi-directional buffers 841-848.

Figure 9:
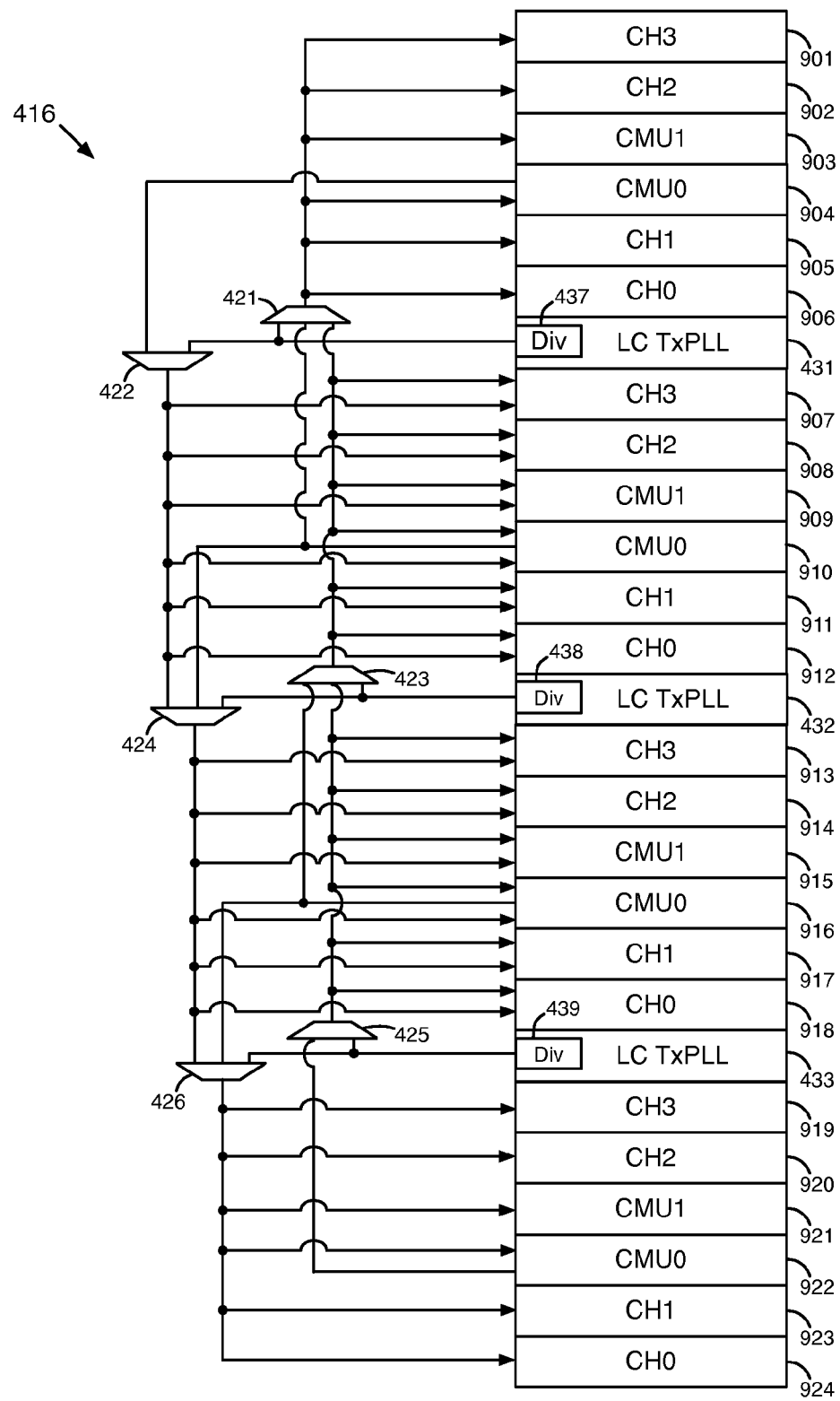
FIG. 9 is a more detailed diagram of a clock routing network shown in FIG. 4 used to route clock signals to channels on a device, according to an embodiment of the present invention.

FIG. 9 is a more detailed diagram of the clock routing network 416 shown in FIG. 4. As described above, clock routing network 416 routes clock signals from LC Tx PLLs 431-433 to the channels in quads 411-414. In FIG. 9, quad 411 has channels 901-906, quad 412 has channels 907-912, quad 413 has channels 913-918, and quad 414 has channels 919-924.

Multiplexers 421-426 selectively route the frequency divided output clock signals of divider circuits 437-439 or output clock signals of the CMU channels to channels 901-924. In a particular embodiment, multiplexers 421-426 route clock signals to the transmitter portions of channels 901-924. The clock signals are used to clock serializer circuits in the transmitter portions of channels 901-924.

Multiplexer 421 routes either the output clock signal of divider 437, an output clock signal from CMU channel 910, or the output clock signal of multiplexer 423 to channels 901-906. Multiplexer 422 routes either an output clock signal from CMU channel 904 or the output clock signal of divider 437 to channels 907-912.

Multiplexer 423 routes either the output clock signal of divider 438, an output clock signal from CMU channel 916, or the output clock signal of multiplexer 425 to channels 907-912. Multiplexer 424 routes either the output clock signal of divider 438, an output clock signal from CMU channel 910, or the output clock signal of multiplexer 422 to channels 913-918.

Multiplexer 425 routes either the output clock signal of divider 439 or an output clock signal from CMU channel 922 to channels 913-918. Multiplexer 426 routes either the output clock signal of divider 439, an output clock signal from CMU channel 916, or the output clock signal of multiplexer 424 to channels 919-924.

In some embodiments, each of the conductive routing lines shown in FIG. 9 that connect the channels and PLLs to the multiplexers can represent multiple parallel lines. Thus, each PLL and CMU channel can route multiple clock signals to the multiplexers, and each of the channels can receive 2, 3, or more clock signals from the output terminals of one of the multiplexers.

According to a further embodiment, the device shown in FIGS. 4 and 9 can include additional dedicated routing conductors (not shown) that route clock signals from the two CMU channels in each quad to the other 4 channels in that quad when the CMU channels are configured to function as PLLs.

According to some embodiments, area 491 is an area of the integrated circuit other than an FPGA core logic area containing programmable logic circuits. In some embodiments, techniques of the present invention are applicable to any type of integrated circuit that has an area 491 separate from the periphery and channel areas. The area 491 separate from the periphery and channel areas can be any area that includes circuits (e.g., transistors, resistors, capacitors, etc.) on the integrated circuit. The supply voltage provided to the circuits in the periphery area in these embodiments is isolated from area 491 as described above.

Embodiments of the present invention can be used in numerous types of integrated circuits, such as field programmable gate arrays (FPGAs), programmable logic devices (PLDs), complex programmable logic devices (CPLDs), programmable logic arrays (PLAs), application specific integrated circuits (ASICs), general purpose processors, central processing units (CPUs), digital signal processors, controller integrated circuits, memory integrated circuits, analog integrated circuits, and digital integrated circuits.

Figure 10:
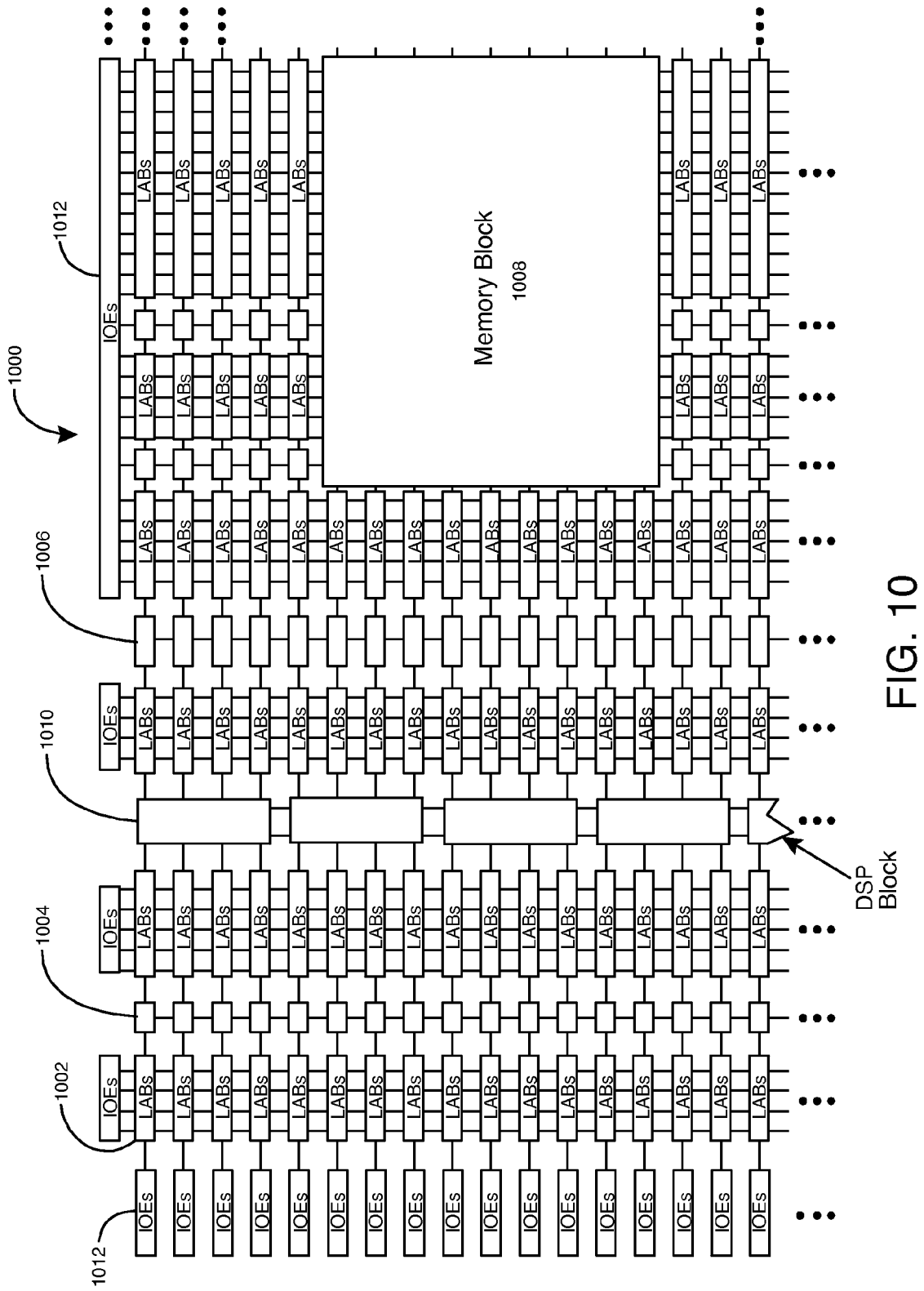
FIG. 10 is a simplified partial block diagram of a field programmable gate array (FPGA) that can include aspects of the present invention.

FIG. 10 is a simplified partial block diagram of a field programmable gate array (FPGA) 1000 that can include aspects of the present invention. FPGA 1000 is merely one example of an integrated circuit that can include features of the present invention.

FPGA 1000 includes a two-dimensional array of programmable logic array blocks (or LABs) 1002 that are interconnected by a network of column and row interconnect conductors of varying length and speed. LABs 1002 include multiple (e.g., 10) logic elements (or LEs). LABs and LEs are located in FPGA core area 491 of device 400.

An LE is a programmable logic circuit block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 1000 also includes a distributed memory structure including random access memory (RAM) blocks of varying sizes provided throughout the array. The RAM blocks include, for example, blocks 1004, blocks 1006, and block 1008. These memory blocks can also include shift registers and first-in-first-out (FIFO) buffers.

FPGA 1000 further includes digital signal processing (DSP) blocks 1010 that can implement, for example, multipliers with add or subtract features. Input/output elements (IOEs) 1012 located, in this example, around the periphery of the chip, support numerous single-ended and differential input/output standards. IOEs 1012 are coupled to pins. Each of the pins is an external terminal of the FPGA. It is to be understood that FPGA 1000 is described herein for illustrative purposes only and that the present invention can be implemented in many different types of PLDs, FPGAs, and ASICs.

Figure 11:
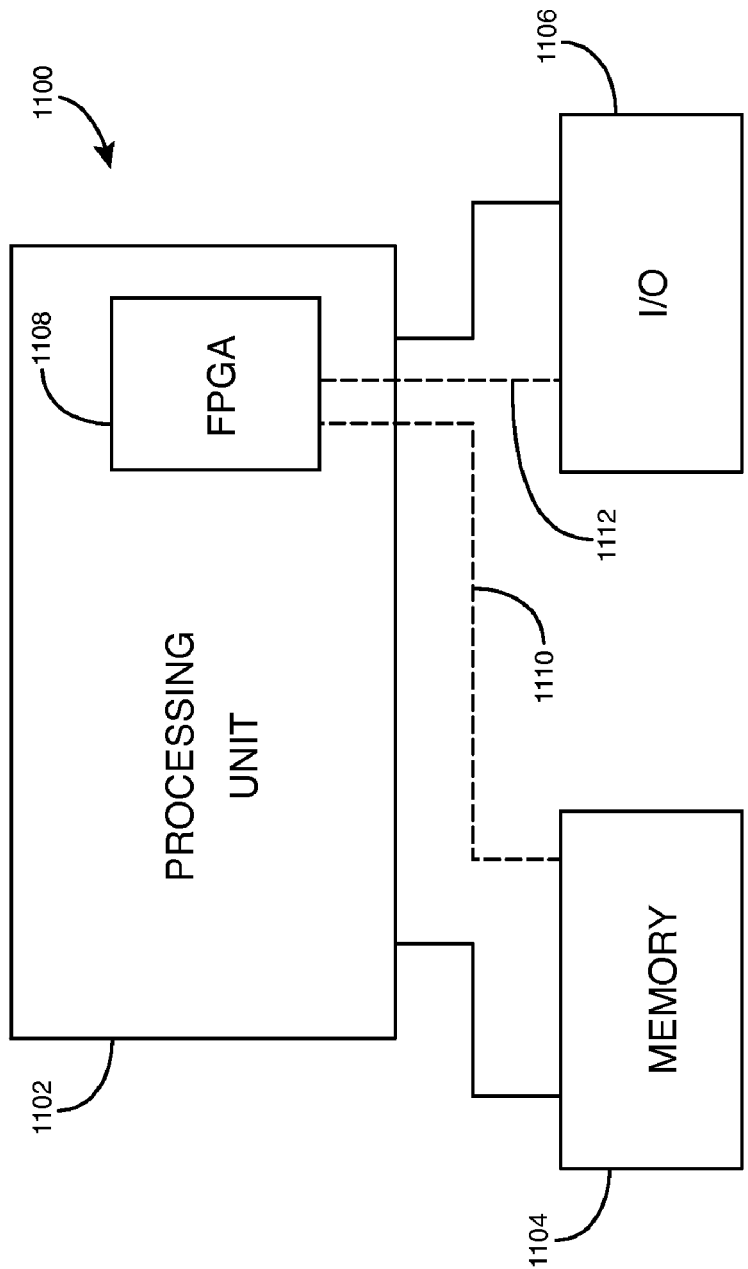
FIG. 11 shows a block diagram of an exemplary digital system that can embody techniques of the present invention.

The present invention can also be implemented in a system that has an FPGA as one of several components. FIG. 11 shows a block diagram of an exemplary digital system 1100 that can embody techniques of the present invention. System 1100 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 1100 can be provided on a single board, on multiple boards, or within multiple enclosures.

System 1100 includes a processing unit 1102, a memory unit 1104, and an input/output (I/O) unit 1106 interconnected together by one or more buses. According to this exemplary embodiment, an FPGA 1108 is embedded in processing unit 1102. FPGA 1108 can serve many different purposes within the system of FIG. 11. FPGA 1108 can, for example, be a logical building block of processing unit 1102, supporting its internal and external operations. FPGA 1108 is programmed to implement the logical functions necessary to carry on its particular role in system operation. FPGA 1108 can be specially coupled to memory 1104 through connection 1110 and to I/O unit 1106 through connection 1112.

Processing unit 1102 can direct data to an appropriate system component for processing or storage, execute a program stored in memory 1104, receive and transmit data via I/O unit 1106, or other similar functions. Processing unit 1102 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 1108 can control the logical operations of the system. As another example, FPGA 1108 acts as a reconfigurable processor that can be reprogrammed as needed to handle a particular computing task. Alternatively, FPGA 1108 can itself include an embedded microprocessor. Memory unit 1104 can be a random access memory (RAM), read only memory (ROM), fixed or flexible disk media, flash memory, tape, or any other storage means, or any combination of these storage means.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A circuit comprising:
 a first area;
 a second area comprising a first locked loop circuit that generates a first clock signal, the first locked loop circuit receiving a supply voltage that is isolated from noise generated in the first area; and a third area comprising multiple quads of channels and a clock line coupled to route at least one clock signal generated in the second area to the channels in each of the quads, wherein the third area is separate from the second area in the circuit.

2. The circuit defined in claim 1 wherein the third area further comprises a second locked loop circuit that generates a second clock signal in response to the first clock signal received from the clock line, and a clock routing network coupled to route the second clock signal to transmitters in each of the quads.

3. The circuit defined in claim 2 wherein the clock line comprises conductors and bi-directional buffer circuits that are configurable to serially couple the conductors together, and each of the bi-directional buffer circuits is configurable to be turned off in response to at least one enable signal to electrically isolate two of the conductors into separate segments.

4. The circuit defined in claim 3 wherein the second area further comprises a third locked loop circuit that generates a third clock signal and a fourth locked loop circuit that generates a fourth clock signal, and wherein the bi-directional buffer circuits are configurable to divide the clock line into at least three segments so that each of the segments routes one of the first, the third, and the fourth clock signals to receivers in at least one of the quads.

5. The circuit defined in claim 1 wherein each of the quads comprises regular channels and clock multiplier unit channels, and each of the regular channels and the clock multiplier unit channels is configured to transmit and receive data through pins.

6. The circuit defined in claim 5 wherein the third area comprises at least 4 quads, and each of the quads comprises 6 channels that are configurable to transmit and receive data.

7. The circuit defined in claim 1 wherein the circuit is a field programmable gate array integrated circuit, and the first area comprises programmable logic circuits.

8. The circuit defined in claim 2 wherein the clock routing network comprises first multiplexers configurable to route the second clock signal to transmitters in at least two of the quads, and second multiplexers configurable to route the second clock signal to transmitters in at least two of the quads.

9. The circuit defined in claim 8 wherein the third area further comprises a third locked loop circuit that generates a third clock signal in response to a clock signal received from the clock line, the first multiplexers are configurable to route the third clock signal to transmitters in at least three of the quads, and the second multiplexers are configurable to route the third clock signal to transmitters in at least one of the quads.

10. The circuit defined in claim 2 wherein the first locked loop circuit is a first phase-locked loop, and the second locked loop circuit is a second phase-locked loop.

11. An integrated circuit comprising:
a first area;
a second area comprising a first locked loop circuit that generates a first clock signal, and a second locked loop circuit that generates a second clock signal, the first and the second locked loop circuits receiving a supply voltage that is isolated from noise generated in the first area; and
a third area comprising groups of channels and a clock line that comprises a first segment coupled to route the first clock signal to the channels in at least one of the groups, a second segment coupled to route the second clock signal to the channels in at least one of the groups, and a buffer coupled to the first and the second segments of the clock line that is configurable to isolate the first and the second segments from each other.

12. The integrated circuit defined in claim 11 wherein the third area further comprises a third locked loop circuit that generates a third clock signal in response to a clock signal received from the clock line, and a clock routing network configurable to route the third clock signal to transmitters in the channels in each of the groups.

13. The integrated circuit defined in claim 12 wherein the third area further comprises a fourth locked loop circuit that generates a fourth clock signal in response to a clock signal received from the clock line and a fifth locked loop circuit that generates a fifth clock signal in response to a clock signal received from the clock line, and wherein the clock routing network is configurable to route the fourth and the fifth clock signals to transmitters in the channels in each of the groups.

14. The integrated circuit defined in claim 11 wherein the first segment of the clock line comprises a first conductor, the second segment of the clock line comprises a second conductor, and the buffer is a bi-directional buffer circuit coupled to the first and the second conductors.

15. The integrated circuit defined in claim 11 wherein the second area further comprises a third locked loop circuit that generates a third clock signal and receives the supply voltage, and wherein the clock line further comprises a third segment coupled to route the third clock signal to the channels in at least one of the groups.

16. The integrated circuit defined in claim 11 wherein each of the groups of channels comprises at least 2 regular channels and at least 2 clock multiplier unit channels, each of the regular channels and the clock multiplier unit channels in the groups are configured to transmit and receive data through pins, and the third area comprises at least 4 of the groups.

17. The integrated circuit defined in claim 11 wherein the second area and the third area are separated by a physical coding sub-layer.

18. The integrated circuit defined in claim 13 wherein the first and the second locked loop circuits are coupled to receive reference clock signals through input pins, and wherein the clock line is configurable to route the first and the second clock signals to the third, the fourth, and the fifth locked loop circuits.

19. The integrated circuit defined in claim 13 wherein the integrated circuit is a field programmable gate array integrated circuit, and the first area comprises programmable logic circuits.

20. A method for routing clock signals to channels, the method comprising:
generating a first clock signal in a first area of a circuit in response to a first input reference clock signal and a supply voltage that is isolated from noise generated in a second area of the circuit;
generating a second clock signal in the first area of the circuit in response to a second input reference clock signal and the supply voltage;
routing the first clock signal through a first segment of a clock line to channels in a first quad in a third area of the circuit; and
routing the second clock signal through a second segment of the clock line to channels in a second quad in the third area.

21. The method defined in claim 20 further comprising:
generating a third clock signal in the first area of the circuit in response to a third input reference clock signal and the supply voltage; and
routing the third clock signal through a third segment of the clock line to channels in a third quad in the third area.

22. The method defined in claim 21 further comprising:
generating a fourth clock signal in the third area in response to one of the first, the second, and the third clock signals;
generating a fifth clock signal in the third area in response to one of the first, the second, and the third clock signals;
routing the fourth clock signal to channels in at least one of the first, the second, and the third quads; and
routing the fifth clock signal to channels in at least one of the first, the second, and the third quads.

23. A circuit comprising:
means for generating a first clock signal in a first area of a circuit in response to a first input reference clock signal and a supply voltage that is isolated from noise generated in a second area of the circuit;
means for generating a second clock signal in the first area of the circuit in response to a second input reference clock signal and the supply voltage;
means for routing the first clock signal through a first segment of a clock line to channels in a first group of channels in a third area of the circuit;
means for routing the second clock signal through a second segment of the clock line to channels in a second group of channels in the third area; and
means for isolating the first segment of the clock line from the second segment of the clock line.

* * * * *